United States Patent
Korhonen et al.

(10) Patent No.: US 9,019,916 B2
(45) Date of Patent: *Apr. 28, 2015

(54) RACH PREAMBLE RESPONSE WITH FLEXIBLE UL ALLOCATION

(75) Inventors: Juha S. Korhonen, Espoo (FI); Esa M. Malkamaki, Espoo (FI)

(73) Assignee: Nokia Corporation, Espoo (FI)

(*) Notice: Subject to any disclaimer, the term of this patent is extended or adjusted under 35 U.S.C. 154(b) by 70 days.

This patent is subject to a terminal disclaimer.

(21) Appl. No.: 13/585,989

(22) Filed: Aug. 15, 2012

(65) Prior Publication Data

US 2014/0050157 A1     Feb. 20, 2014

Related U.S. Application Data

(63) Continuation of application No. 12/378,192, filed on Feb. 11, 2009, now Pat. No. 8,363,671.

(60) Provisional application No. 61/065,376, filed on Feb. 11, 2008.

(51) Int. Cl.
   *H04W 4/00*     (2009.01)
   *H04W 74/00*    (2009.01)
   *H04W 72/12*    (2009.01)

(52) U.S. Cl.
   CPC ........ *H04W 74/006* (2013.01); *H04W 72/1294* (2013.01)

(58) Field of Classification Search
   CPC ... H04W 72/04; H04W 56/00; H04W 74/004; H04J 3/065
   USPC ......... 370/329, 335, 324, 350, 503, 509, 436, 370/437, 462, 468, 280, 278, 277, 330, 345, 370/347, 319, 478
   See application file for complete search history.

(56) References Cited

U.S. PATENT DOCUMENTS

| 8,363,671 B2 * | 1/2013 | Korhonen et al. ............ 370/437 |
| 2007/0206531 A1 | 9/2007 | Pajukoski et al. ............. 370/329 |
| 2009/0191875 A1 | 7/2009 | Vujcic et al. .................. 455/436 |

(Continued)

OTHER PUBLICATIONS

Motorola: "Synchronized Random Access Channel and Scheduling Request", 3GPP Draft, R1-063046_RA_SR_Final, Mobile Competence Centre; 650, Route Des Lucioles, F-06921 Sophia-Antipolis Cedex. France. vol. RAN WG1., Riga, Latvia; Nov. 6, 2006, Oct. 30, 2006, XP050103511.

(Continued)

*Primary Examiner* — Chi H Pham
*Assistant Examiner* — Alexander O Boakye
(74) *Attorney, Agent, or Firm* — Harrington & Smith

(57) ABSTRACT

A method for allocating resources between a mobile communication device and a network access node is described. The method includes sending a random access preamble message to the network access node. Receiving a random access response message which includes a response to the random access preamble message is also included in the method. The response includes UL resource allocation information for scheduling an UL transmission. The UL resource allocation information includes information identifying one or more individual time subframes allocated for the UL transmission. The method also includes sending the UL transmission in the identified one or more individual time subframes. Apparatus and computer readable memory are also described.

27 Claims, 4 Drawing Sheets

(56) References Cited

U.S. PATENT DOCUMENTS

2009/0203384 A1    8/2009    Vujcic ........................... 455/450
2010/0172299 A1    7/2010    Fischer et al. ................. 370/328

OTHER PUBLICATIONS

Motorola et al.: "E-UTRA Random Access Channel TP", 3GPP Draft; R1-061083-RACH, Mobile Competence Centre, 650, Route Des Lucioles, F-06921 Sophia-Antipolis Cedex; France, vol. RAN WG1, Athens, Greece, Mar. 27, 2006, Mar. 30, 2006, XP050101973.
Catt et al: "EUTRA TDD Random Access Procedure" 3GPP Draft; R1-060932, Mobile Competence Centre; 650, Route Des Lucioles, F-06921 Sophia-Antipolis Cedex; France, vol. RAN WG1, Athens, Greece; Mar. 27, 2006, Mar. 21, 2006, XP050101835.
3GPP TS 36.300, V8.3.0 (Dec. 2007), "$3^{rd}$ Generation Partnership Project; Technical Specification Group Radio Access Network; Evolved Universal Terrestrial Radio Access (E-UTRA) and Evolved Universal Terrestrial Access Network (E-UTRAN); Overall description; Stage 2 (Release 8)", 121 pgs.
3GPP TS 36.321, V8.0.0 (Dec. 2007), "$3^{rd}$ Generation Partnership Project; Technical Specification Group Radio Access Network; Evolved Universal Terrestrial Radio Access (E-UTRA) Medium Access Control (MAC) protocol specification (Release 8)", 23 pgs.

* cited by examiner

RACH PREAMBLE RESPONSE WITH FLEXIBLE UL ALLOCATION

CROSS REFERENCE

This patent application is a continuation of and claims priority to U.S. application Ser. No. 12/378,192 filed on Feb. 11, 2009 now U.S. Pat. No. 8,363,671 which claims priority to Provisional U.S. Application Ser. No. 61/065,376, filed Feb. 11, 2008, the disclosures of which are incorporated by reference in their entirety.

TECHNICAL FIELD

The exemplary and non-limiting embodiments of this invention relate generally to wireless communication systems, methods, devices and computer programs and, more specifically, relate to techniques to achieve synchronization and allocation of resources between a mobile communication device and a network access node.

BACKGROUND

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Various abbreviations that appear in the specification and/or in the drawing figures are defined as follows:

3GPP third generation partnership project
BW bandwidth
C-RNTI cell radio network temporary identifier
DL downlink (eNB towards UE)
eNB EUTRAN Node B (evolved Node B)
EPC evolved packet core
EUTRAN evolved UTRAN (LTE)
FDD frequency division duplex
HARQ hybrid automatic repeat request
LTE long term evolution
MAC medium access control
MCS modulation coding scheme
MM mobility management
MME mobility management entity
Node B base station
O&M operations and maintenance
OFDMA orthogonal frequency division multiple access
PDCCH physical downlink control channel
PDCP packet data convergence protocol
PDSCH physical downlink shared channel
PDU protocol data unit
PHY physical
PRACH physical random access channel
PRB physical resource block
RA-RNTI random access radio network temporary identifier
RB radio bearer
RLC radio link control
RRC radio resource control
RRM radio resource management
SC-FDMA single carrier, frequency division multiple access
SDU service data unit
SFm m:th ($m^{th}$) subframe of a radio frame
S-GW serving gateway
TDD time division duplex
UE user equipment
UL uplink (UE towards eNB)
UTRAN universal terrestrial radio access network A proposed communication system known as evolved UTRAN (E-UTRAN, also referred to as UTRAN-LTE or as E-UTRA) is currently under development within the 3GPP. The current working assumption is that the DL access technique will be OFDMA, and the UL access technique will be SC-FDMA.

One specification of interest to these and other issues related to the invention is 3GPP TS 36.300, V8.3.0 (2007-12), 3rd Generation Partnership Project; Technical Specification Group Radio Access Network; Evolved Universal Terrestrial Radio Access (E-UTRA) and Evolved Universal Terrestrial Access Network (E-UTRAN); Overall description; Stage 2 (Release 8).

FIG. 1A reproduces FIG. 4 of 3GPP TS 36.300, and shows the overall architecture of the E-UTRAN system. The E-UTRAN system includes eNBs, providing the E-UTRA user plane (PDCP/RLC/MAC/PHY) and control plane (RRC) protocol terminations towards the UE. The eNBs are interconnected with each other by means of an X2 interface. The eNBs are also connected by means of an S1 interface to an EPC, more specifically to a MME (Mobility Management Entity) by means of a S1-MME interface and to a Serving Gateway (S-GW) by means of a S1-U interface. The S1 interface supports a many-to-many relation between MMEs/Serving Gateways and eNBs.

The eNB hosts the following functions:
functions for Radio Resource Management: Radio Bearer Control, Radio Admission Control, Connection Mobility Control, Dynamic allocation of resources to UEs in both uplink and downlink (scheduling);
IP header compression and encryption of user data stream;
selection of a MME at UE attachment;
routing of User Plane data towards Serving Gateway;
scheduling and transmission of paging messages (originated from the MME);
scheduling and transmission of broadcast information (originated from the MME or O&M); and
measurement and measurement reporting configuration for mobility and scheduling.

Also of interest is 3GPP TS 36.321, V8.0.0 (2007-12), 3rd Generation Partnership Project; Technical Specification Group Radio Access Network; Evolved Universal Terrestrial Radio Access (E-UTRA) Medium Access Control (MAC) protocol specification (Release 8).

Of particular interest herein is the random access procedure of the LTE (E-UTRA) system. The procedure is described in 3GPP 36.300 v.8.3.0, and its steps are shown in FIG. 1B, which reproduces Figure. 10.1.5.1-1: Connection based Random Access Procedure, of 3GPP TS 36.300. The steps shown in FIG. 1B are described in detail in subclause 10.1.5.1 of 3GPP TS 36.300.

Briefly, the UE transmits a preamble and expects a response from eNB in the form of a so-called Message 2. Message 2 is transmitted on the PDSCH and its resources are allocated on the PDCCH as for any DL message. The resource allocation of Message 2 is addressed with an identity RA-RNTI that is associated with the frequency and time resources of a PRACH, but is common for the different preamble sequences. The Message 2 contains UL allocations for the transmissions of a Message 3 in the UL (step 3 of the random access procedure).

As is stated in subclause 10.1.5.1 of 3GPP TS 36.300 with respect to the Random Access Response Message (message 2), the Random Access Response generated by the MAC on the DL-SCH is semi-synchronous (within a flexible window of which the size is one or more TTI) with Message 1. No HARQ is used, and the message is addressed to the RA-RNTI on L1/L2 control channel. The Message 2 conveys at least a RA-preamble identifier, timing alignment information, an initial UL grant and an assignment of a temporary C-RNTI (which may or may not be made permanent upon RRC Contention Resolution). The Message 2 is intended for a variable number of UEs in one DL-SCH message.

As is stated in subclause 5.1.4 of 3GPP TS 36.321 with respect to the Random Access Response reception, once the Random Access Preamble is transmitted, the UE monitors the [PDCCH] in the TTI window [RA_WINDOW_BEGIN-RA_WINDOW_END] for Random Access Response(s). The UE may stop monitoring for Random Access Response(s) after successful reception of a Random Access Response corresponding to the Random Access Preamble transmission made by the UE.

If notification of a reception of the Random Access Response is received from lower layers, the UE shall: if the Random Access Response contains a Random Access Preamble identifier corresponding to the transmitted Random Access Preamble (see subclause 5.1.3) the UE shall: consider this Random Access Response reception successful and provide an indication to the higher layers; process the received Timing Alignment value (see subclause 5.2); and if an UL grant was received, process the UL grant value. If the UE does not have a C-RNTI, the Temporary C-RNTI is set to the value received in the Random Access Response message.

If no Random Access Response is received within the TTI window [RA_WINDOW_BEGIN—RA_WINDOW_END], or if all received Random Access Responses contain Random Access Preamble identifiers that do not match the transmitted Random Access Preamble, the Random Access Response reception is considered not successful and the UE shall:

- if a value of a PREAMBLE_TRANSMISSION_COUNTER is less than PREAMBLE_TRANS_MAX, increment PREAMBLE_TRANSMISSION_COUNTER by 1; [compute a backoff value indicating when a new Random Access transmission shall be attempted]; and proceed to the selection of a Random Access Resource (see subclause 5.1.2).
- Else, if PREAMBLE_TRANSMISSION_COUNTER is equal to PREAMBLE_TRANS_MAX the UE indicates to the higher layer that the random access procedure failed.

A problem that arises relates to providing a flexible allocation of the Message 3 transmission while minimizing the load on PDCCH and the delay of the preamble response. The normal UL allocation, given on the PDCCH in a subframe n, points to the UL subframe n+k, where k is a parameter specified in the standard or broadcast as a part of the system information. If this definition is applied to the UL resource allocations included in the Message 2, the corresponding Messages 3 are allocated to the same UL subframe. This procedure can be problematic in some cases, especially if the system BW is small.

3GPP TS 36.321 (v.8.0.0) permits a flexible time window for transmission of the Message 2. This provides some flexibility for the Messages 3 scheduling since the eNB can delay Message 2 transmission, or it can divide the responses corresponding to the same RA-RNTI, into two or more instances of the Message 2.

However, this approach introduces at least two problems. First, a preamble retransmission by the UE is delayed because the UE needs to search for the preamble response until the end of the response window before it can conclude that its preamble was not detected by the eNB, and that the preamble retransmission is needed. Second, if the preamble responses are sent in two or more instances of the Message 2 then PDCCH resources are wasted, since each instance of the Message 2 requires its own resource allocation on the PDCCH.

SUMMARY

The below summary section is intended to be merely exemplary and non-limiting.

The foregoing and other problems are overcome, and other advantages are realized, by the use of the exemplary embodiments of this invention.

An exemplary embodiment in accordance with this invention is a method for allocating resources between a mobile communication device (e.g., an UE) and a network access node (e.g., an eNB). The method includes sending a random access preamble message to the network access node. Receiving a random access response message which includes a response to the random access preamble message is also included in the method. The response includes UL resource allocation information for scheduling an UL transmission. The UL resource allocation information includes information identifying one or more individual time subframes allocated for the UL transmission. The method also includes sending the UL transmission in the identified one or more individual time subframes.

A further exemplary embodiment in accordance with this invention is an apparatus for allocating resources between a mobile communication device and a network access node. The apparatus includes means for sending a random access preamble message to the network access node. Means for receiving a random access response message which includes a response to the random access preamble message is also included in the apparatus. The response includes UL resource allocation information for scheduling an UL transmission. The UL resource allocation information includes information identifying one or more individual time subframes allocated for the UL transmission. The apparatus also includes means for sending the UL transmission in the identified one or more individual time subframes.

An additional exemplary embodiment in accordance with this invention is a computer readable medium tangibly encoding a computer program for allocating resources between a mobile communication device and a network access node. The computer program includes program instructions, execution of the program instructions resulting in operations including sending a random access preamble message to the network access node. Receiving a random access response message which includes a response to the random access preamble message is also included in the program instructions. The response includes UL resource allocation information for scheduling an UL transmission. The UL resource allocation information includes information identifying one or more individual time subframes allocated for the UL transmission. The program instructions also include sending the UL transmission in the identified one or more individual time subframes.

A further exemplary embodiment in accordance with this invention is an apparatus for allocating resources between a mobile communication device and a network access node. The apparatus includes an input configured to receive a random access response message which includes a response to a random access preamble message is. The response includes UL resource allocation information for scheduling an UL transmission. The UL resource allocation information includes information identifying one or more individual time subframes allocated for the UL transmission. The apparatus also includes a controller configured to send the UL transmission in the identified one or more individual time subframes.

An additional exemplary embodiment in accordance with this invention is a method for allocating resources between a mobile communication device and a network access node. The method includes forming a random access response message which includes a response to a random access preamble message. The response to the random access preamble message includes UL resource allocation information for scheduling an UL transmission for a user equipment. The UL resource allocation information includes information identifying one or more individual time subframe allocated for the UL transmission. The method also includes sending the random access response message to the user equipment.

A further exemplary embodiment in accordance with this invention is an apparatus for allocating resources between a mobile communication device and a network access node. The apparatus includes means for forming a random access response message which includes a response to a random access preamble message. The response to the random access preamble message includes UL resource allocation information for scheduling an UL transmission for a user equipment. The UL resource allocation information includes information identifying one or more individual time subframe allocated for the UL transmission. The apparatus also includes means for sending the random access response message to the user equipment.

An additional exemplary embodiment in accordance with this invention is a computer readable medium tangibly encoding a computer program for allocating resources between a mobile communication device and a network access node. The computer program includes program instructions, execution of the program instructions resulting in operations including forming a random access response message which includes a response to a random access preamble message. The response to the random access preamble message includes UL resource allocation information for scheduling an UL transmission for a user equipment. The UL resource allocation information includes information identifying one or more individual time subframe allocated for the UL transmission. The program instructions also include sending the random access response message to the user equipment.

A further exemplary embodiment in accordance with this invention is an apparatus for allocating resources between a mobile communication device and a network access node. The apparatus includes a controller which includes a message generating block configured to form a random access response message which includes a response to a random access preamble message. The response to the random access preamble message includes UL resource allocation information for scheduling an UL transmission for a user equipment. The UL resource allocation information includes information identifying one or more individual time subframe allocated for the UL transmission. The controller is also configured to operate with a transmitter to send the random access response message to the user equipment.

BRIEF DESCRIPTION OF THE DRAWINGS

The foregoing and other aspects of exemplary embodiments of this invention are made more evident in the following Detailed Description, when read in conjunction with the attached Drawing Figures, wherein.

DETAILED DESCRIPTION

Figure 1A:
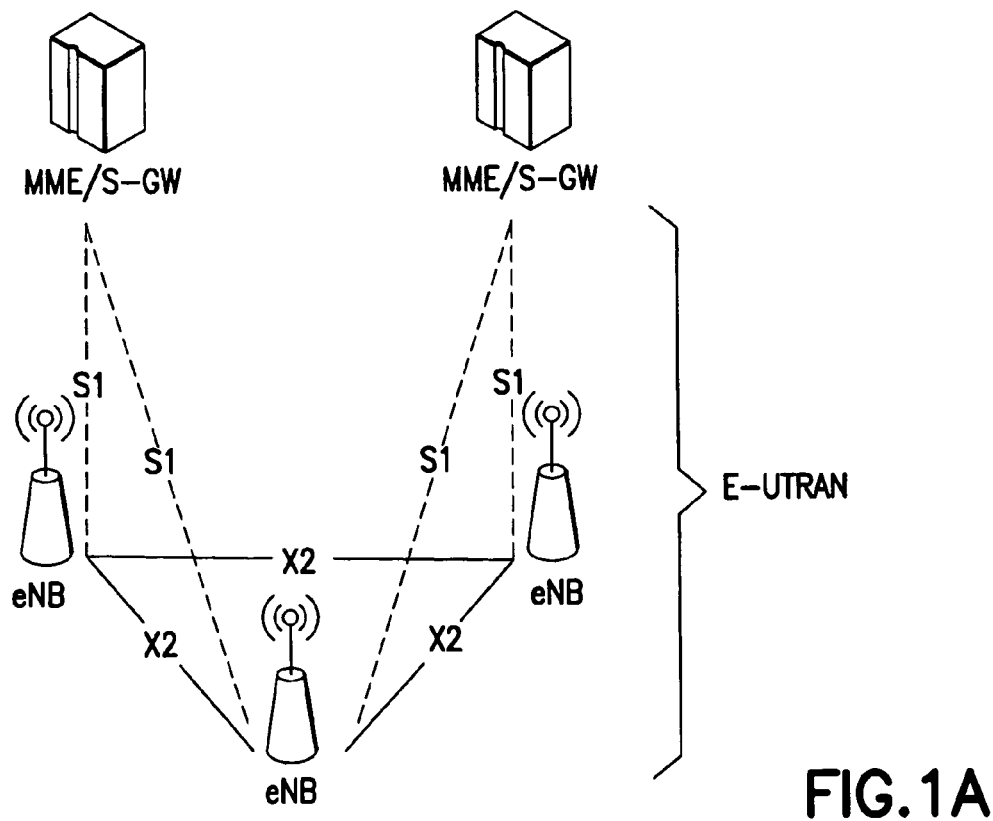
FIG. 1A reproduces FIG. 4 of 3GPP TS 36.300, and shows the overall architecture of the E-UTRAN system.
Figure 1B:
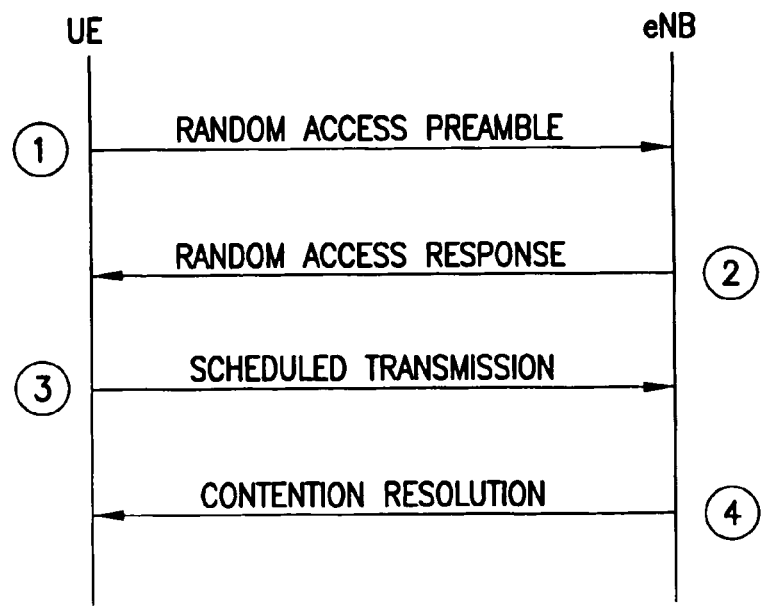
FIG. 1B reproduces Figure 10.1.5.1-1: Connection based Random Access Procedure, of 3GPP TS 36.300.
Figure 2:
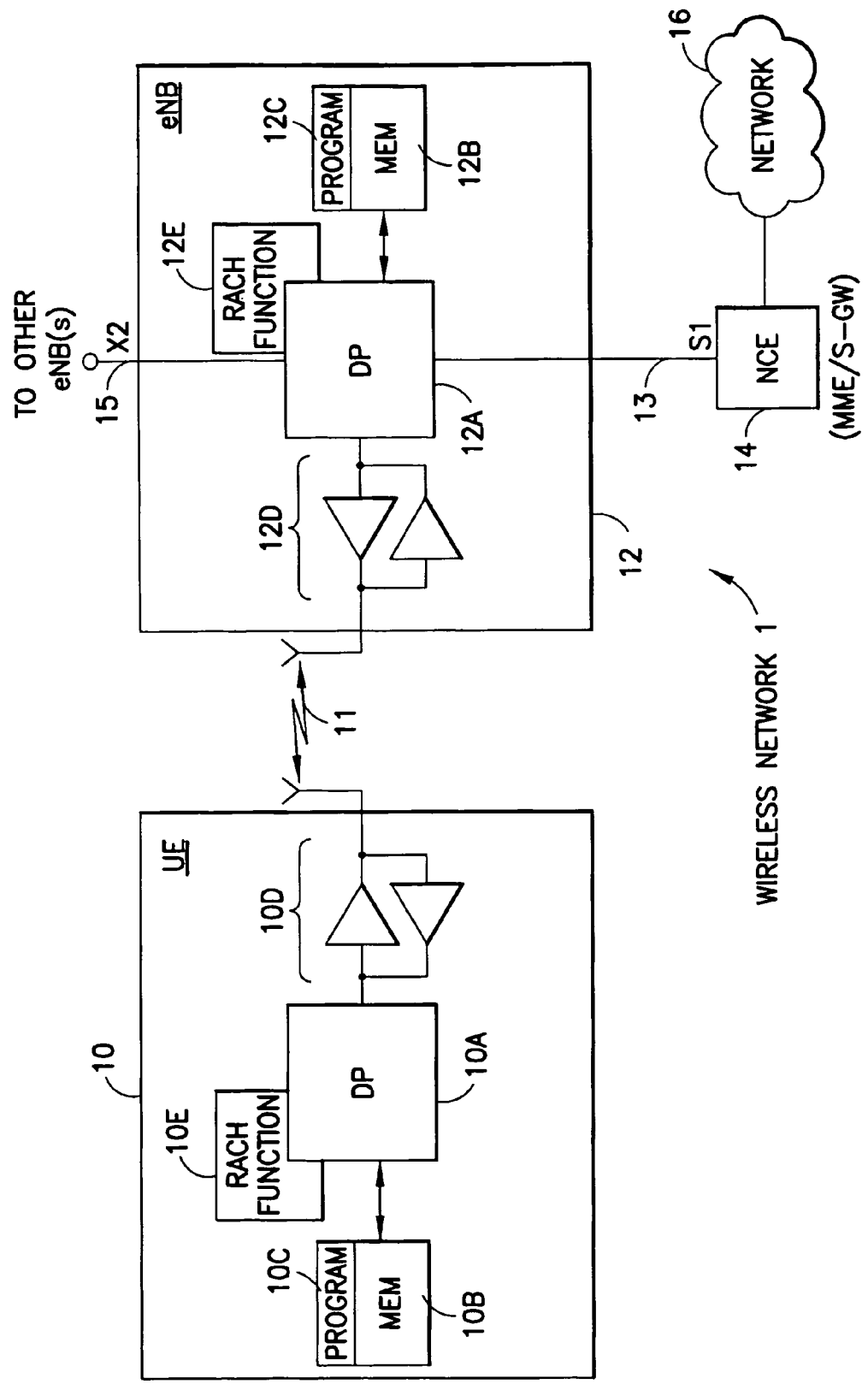
FIG. 2 shows a simplified block diagram of various electronic devices that are suitable for use in practicing exemplary embodiments in accordance with this invention.

Reference is made to FIG. 2 for illustrating a simplified block diagram of various electronic devices that are suitable for use in practicing exemplary embodiments in accordance with this invention. In FIG. 2 a wireless network 1 is adapted for communication with an apparatus, such as a mobile communication device which may be referred to as a UE 10, via a network access node, such as a Node B (base station), and more specifically an eNB 12. The network 1 may include a network control element (NCE) 14 that may include the MME/S-GW functionality shown in FIG. 1A, and which provides connectivity with a network 16, such as a telephone network and/or a data communications network (e.g., the internet).

The UE 10 includes a controller, such as a computer or a data processor (DP) 10A, a memory (MEM) 10B that stores a program (PROG) 10C, and a suitable radio frequency (RF) transceiver 10D for bidirectional wireless communications with the eNB 12, which also includes a controller, such as a computer or a data processor (DP) 12A, a MEM 12B that stores a PROG 12C, and a suitable RF transceiver 12D.

The eNB 12 is coupled via a data path 13 to the NCE 14, which may be implemented as the S1 interface shown in FIG. 1A. An instance of the X2 interface 15 may be present for coupling to another eNB (not shown). At least one of the PROGs 10C and 12C is assumed to include program instructions that, when executed by the associated DP, enable the electronic device to operate in accordance with exemplary embodiments in accordance with this invention, as will be discussed below in greater detail.

That is, exemplary embodiments in accordance with this invention may be implemented at least in part by computer software executable by the DP 10A of the UE 10 and by the DP 12A of the eNB 12, or by hardware, or by a combination of software and hardware.

For the purposes of describing exemplary embodiments in accordance with this invention the UE 10 may be assumed to also include a RACH functional unit 10E, and the eNB 12 also includes a RACH functional unit 12E. The RACH functional units 10E, 12E, which may form a part of the MAC functionality of each of the UE 10 and the eNB 12, are assumed to be constructed and operated in accordance with exemplary embodiments in accordance with this invention.

In general, the various embodiments of the UE 10 can include, but are not limited to, cellular telephones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The MEMs 10B and 12B may be of any type suitable to the local technical environment and may be implemented using any suitable data storage technology, such as semiconductor based memory devices, flash memory, magnetic memory devices and systems, optical memory devices and systems, fixed memory and removable memory.

The DPs 10A and 12A may be of any type suitable to the local technical environment, and may include one or more of general purpose computers, special purpose computers, microprocessors, digital signal processors (DSPs) and processors based on a multicore processor architecture, as non-limiting examples.

Typically there will be a plurality of UEs 10 serviced by the eNB 12. The eNBs 10 may or may not be identically constructed, but in general are all assumed to be electrically and logically compatible with the relevant network protocols and standards needed for operation in the wireless network 1.

Figure 5:
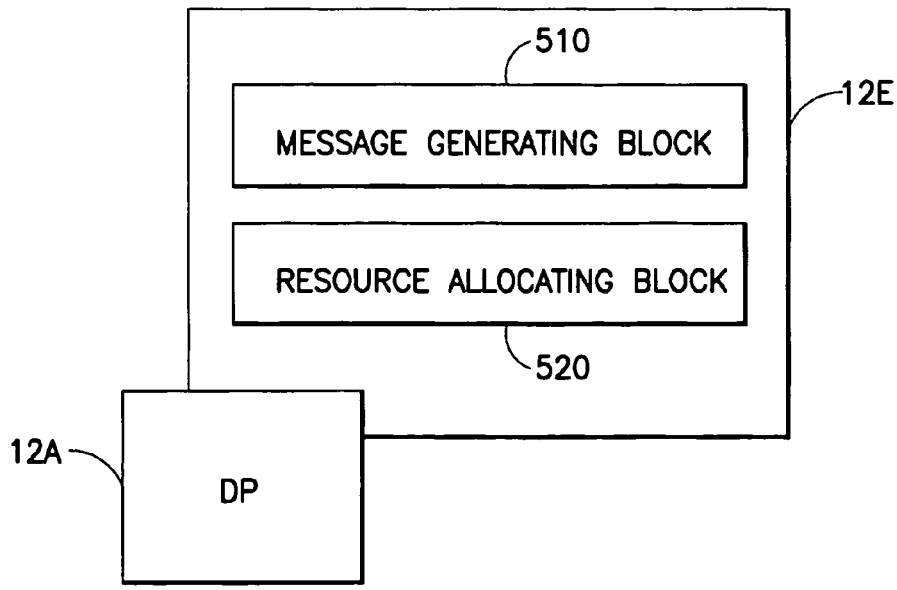
FIG. 5 shows a simplified block diagram of an non-limiting exemplary controller for various electronic devices that are suitable for use in practicing exemplary embodiments in accordance with this invention.

FIG. 5 shows a simplified block diagram of an non-limiting exemplary controller for various electronic devices that are suitable for use in practicing exemplary embodiments in accordance with this invention. A controller (e.g., DP 12A of eNB12) may include a RACH functional unit 12E. The RACH functional unit 12E may be considered to include a message generating block 510. Additionally, a resource allocating block 520 may also be included. The controller may also be configured to operate with the RF transceiver 12D.

Describing now in greater detail exemplary embodiments in accordance with this invention, the eNB 12, more specifically the RACH functional unit 12E, includes a timing parameter with each UL resource allocation sent in a Message 2 on the PDSCH. This timing parameter may be used to point to resource allocations to different subframes. This is schematically shown in the lower part of FIG. 3, where only the timing relations are shown in the Figure, and where SFm refers to the m:th subframe of a radio frame. In addition, it is assumed that scheduling in the frequency dimension is also performed, which may be conventional in nature.

Figure 3:
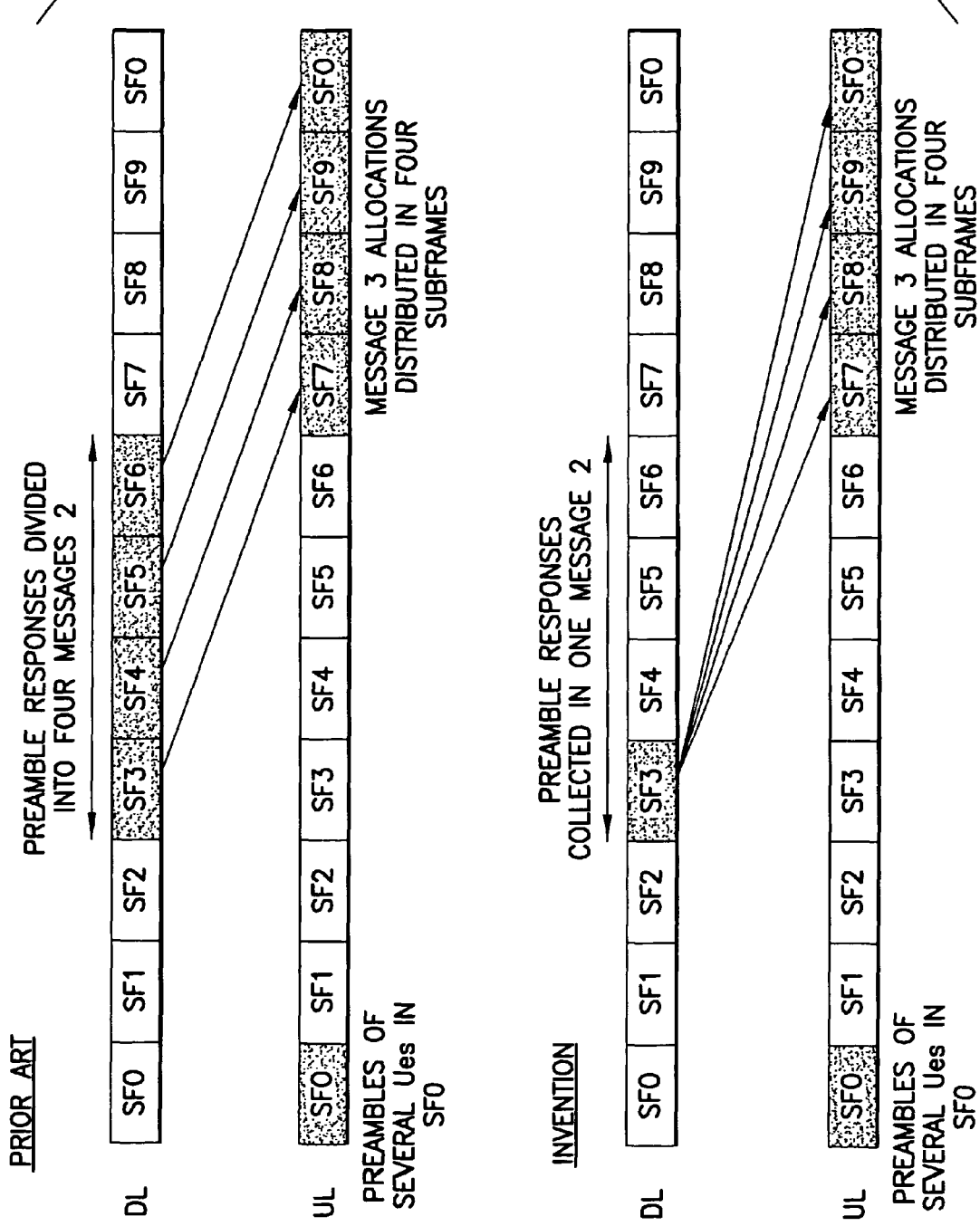
FIG. 3 shows in the upper portion thereof a conventional approach where multiple instances of Message 3 are each associated with an instance of the Message 2, while the lower portion of FIG. 3 shows that one instance of the Message 2 includes information for multiple instances of the Message 3, in accordance with exemplary embodiments in accordance with this invention.

The conventional approach for a response where four random access preambles have been detected is compared with an approach using an exemplary response in accordance with this invention in FIG. 3. The Message 3 transmissions from the UEs need to be allocated to different subframes. The upper portion of FIG. 3 shows the conventional approach where multiple instances of the Message 2 are transmitted in the DL in order to disperse the Messages 3 in the UL. The lower portion of FIG. 3 shows the saving in BW and signaling load that is achieved by collecting several preamble responses into one Message 2 sent on the DL, where the single Message 2 contains information for multiple instances of the Message 3.

In the conventional approach a resource allocation for Message 3 includes only a pointer to the allocated frequency resources. In an exemplary approach in accordance with this invention, additional bits (e.g., one or more bits) are included with each resource allocation. With these additional bits the eNB 12 indicates that the resource allocation is delayed/offset by 0, 1, 2, or 3 (assuming the use of two bits) time subframes as compared to a nominal value.

One clear advantage to this approach is that the Message 3 transmissions may be distributed in time without imposing an additional signaling load on the PDCCH, and without delaying a preamble retransmission by the UE 10 provided that the response window is shortened accordingly.

It is noted that it has been previously agreed to in the standardization process that each response that is included in the Message 2 is byte aligned. The other fields of the response give a constraint that the size of the UL allocation field can be, at present, 13, 21, or 29 bits. When the allocation information is optimized for the Message 3 to have a small and nearly constant size, the number of bits may be:

frequency resource+MCS=9 bits;
frequency hopping=1 bit;
transmit power relative to the preamble power=3 bits; and
cyclic shift for DM reference symbols=3;

thereby providing a total of 16 bits. This implies that the allocation field is 21 bits wide. At least two of the remaining 21−16=5 bits may then be used for signaling the delayed resource allocations according to the exemplary embodiments in accordance with this invention.

Based on the foregoing it should be apparent that exemplary embodiments in accordance with this invention provide a method, apparatus and computer program product(s) to enhance the signaling between the eNB 12 and the UE 10 for RACH purposes.

The use of these exemplary embodiments of the invention may be applied to both FDD and TDD systems. In TDD systems the use of the invention is especially advantageous since it is not always possible to have a separate Message 2 for different UL subframes. Thus, and without the use of the embodiments of this invention, a plurality of the Message should be allocated into one (or a few) UL subframes. In the case of FDD both the DL and the UL can be assumed to be continuous, and the conventional approach may be used. However, the use of exemplary embodiments in accordance with this invention provides additional advantages in the FDD case, as described above.

Figure 4:
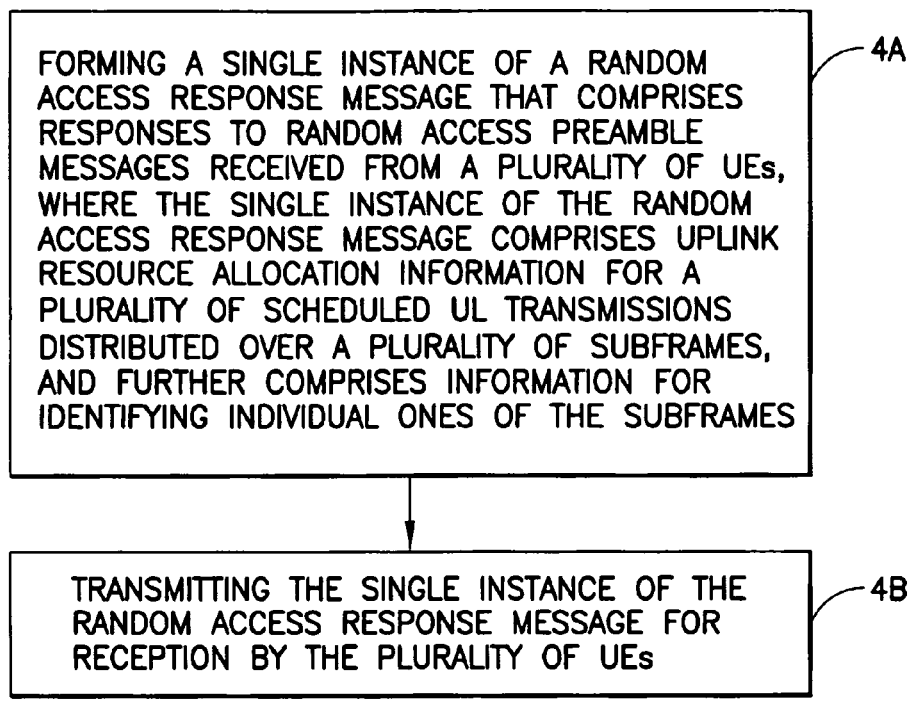
FIG. 4 is a logic flow diagram that illustrates the operation of a method, and a result of execution of computer program instructions, in accordance with exemplary embodiments in accordance with this invention.

Referring to FIG. 4, at Block 4A the eNB forms a single instance of a random access response message that comprises responses to random access preamble messages received from a plurality of UEs, where the single instance of the random access response message comprises uplink resource allocation information for a plurality of scheduled UL transmissions distributed over a plurality of subframes, and that further comprises information for identifying individual ones of the subframes. At Block 4B the eNB transmits the random access response message for reception by the plurality of UEs.

In accordance with the method, individual ones of the UEs receive the single random access response message and schedule their respective UL transmissions accordingly.

In accordance with the foregoing paragraphs, the information provided for identifying individual ones of the subframes is expressed in at least two bits for identifying up to at least four subframes.

The various blocks shown in FIG. 4 may be viewed as method steps, and/or as operations that result from operation of computer program code, and/or as a plurality of coupled logic circuit elements constructed to carry out the associated function(s).

An exemplary embodiment in accordance with this invention is a method for allocating resources between a mobile communication device (e.g., an UE) and a network access node (e.g., an eNB). The method includes sending a random access preamble message to the network access node. Receiving a random access response message which includes a response to the random access preamble message is also included in the method. The response includes UL resource allocation information for scheduling an UL transmission. The UL resource allocation information includes information identifying one or more individual time subframes allocated for the UL transmission. The method also includes sending the UL transmission in the identified one or more individual time subframes.

In an additional exemplary embodiment of the method above, the information identifying the one or more individual time subframe is expressed in one or more bit and is configured to identify up to at least two individual time subframes.

In a further exemplary embodiment of any one of the methods above, the information identifying the one or more individual time subframe indicates an offset.

In an additional exemplary embodiment of any one of the methods above, receiving includes receiving, on a shared channel, a broadcast message that includes the random access response message.

In a further exemplary embodiment of any one of the methods above, the allocation includes an allocation of a FDD resource and/or a TDD resource.

In an additional exemplary embodiment of any one of the methods above, the random access response message also includes one or more additional responses to associated random access preamble messages.

A further exemplary embodiment in accordance with this invention is an apparatus for allocating resources between a mobile communication device and a network access node. The apparatus includes means for sending a random access preamble message to the network access node. Means for receiving a random access response message which includes a response to the random access preamble message is also included in the apparatus. The response includes UL resource allocation information for scheduling an UL transmission. The UL resource allocation information includes information identifying one or more individual time subframes allocated for the UL transmission. The apparatus also includes means for sending the UL transmission in the identified one or more individual time subframes.

In an additional exemplary embodiment of the apparatus above, the information identifying the one or more individual time subframe is expressed in one or more bit and is configured to identify up to at least two individual time subframes.

In a further exemplary embodiment of any one of the apparatus above, the information identifying the one or more individual time subframe indicates an offset.

In an additional exemplary embodiment of any one of the apparatus above, the means for receiving is configured for receiving, on a shared channel, a broadcast message that includes the random access response message.

In a further exemplary embodiment of any one of the apparatus above, the allocation includes an allocation of a FDD resource and/or a TDD resource.

In an additional exemplary embodiment of any one of the apparatus above, the random access response message also includes one or more additional responses to associated random access preamble messages.

A further exemplary embodiment in accordance with this invention is a computer readable medium tangibly encoding a computer program for allocating resources between a mobile communication device and a network access node. The computer program includes program instructions, execution of the program instructions resulting in operations including sending a random access preamble message to the network access node. Receiving a random access response message which includes a response to the random access preamble message is also included in the program instructions. The response includes UL resource allocation information for scheduling an UL transmission. The UL resource allocation information includes information identifying one or more individual time subframes allocated for the UL transmission. The program instructions also include sending the UL transmission in the identified one or more individual time subframes.

In an additional exemplary embodiment of the computer readable medium above, the information identifying the one or more individual time subframe is expressed in one or more bit and is configured to identify up to at least two individual time subframes.

In a further exemplary embodiment of any one of the computer readable media above, the information identifying the one or more individual time subframe indicates an offset.

In an additional exemplary embodiment of any one of the computer readable media above, receiving includes receiving, on a shared channel, a broadcast message that includes the random access response message.

In a further exemplary embodiment of any one of the computer readable media above, the allocation includes an allocation of a FDD resource and/or a TDD resource.

In an additional exemplary embodiment of any one of the computer readable media above, the random access response message also includes one or more additional responses to associated random access preamble messages.

A further exemplary embodiment in accordance with this invention is an apparatus for allocating resources between a mobile communication device and a network access node. The apparatus includes an input configured to receive a random access response message which includes a response to a random access preamble message is. The response includes UL resource allocation information for scheduling an UL transmission. The UL resource allocation information includes information identifying one or more individual time subframes allocated for the UL transmission. The apparatus also includes a controller configured to send the UL transmission in the identified one or more individual time subframes.

In an additional exemplary embodiment of the apparatus above, the information identifying the one or more individual time subframe is expressed in one or more bit and is configured to identify up to at least two individual time subframes.

In a further exemplary embodiment of any one of the apparatus above, the information identifying the one or more individual time subframe indicates an offset.

In an additional exemplary embodiment of any one of the apparatus above, the input is configured to receive, on a shared channel, a broadcast message that includes the random access response message.

In a further exemplary embodiment of any one of the apparatus above, the allocation includes an allocation of a FDD resource and/or a TDD resource.

In an additional exemplary embodiment of any one of the apparatus above, the random access response message also includes one or more additional responses to associated random access preamble messages.

A further exemplary embodiment in accordance with this invention is a method for allocating resources between a mobile communication device and a network access node. The method includes forming a random access response message which includes a response to a random access preamble message. The response to the random access preamble message includes UL resource allocation information for scheduling an UL transmission for a user equipment. The UL resource allocation information includes information identifying one or more individual time subframe allocated for the UL transmission. The method also includes sending the random access response message to the user equipment.

In an additional exemplary embodiment of the method above, the method also includes receiving the UL transmission in accordance with the UL resource allocation in the identified one or more individual time subframe.

In a further exemplary embodiment of any one of the methods above, the information identifying the one or more individual time subframe is expressed in one or more bit and is configured to identify up to at least two individual time subframes.

In an additional exemplary embodiment of any one of the methods above, the information identifying the one or more individual time subframe indicates an offset.

In a further exemplary embodiment of any one of the methods above, the method also includes allocating the UL resources.

In an additional exemplary embodiment of any one of the methods above, sending includes broadcasting the random access response message on a shared channel.

In a further exemplary embodiment of any one of the methods above, the allocation includes an allocation of a FDD resource and/or a TDD resource.

In an additional exemplary embodiment of any one of the methods above, the random access response message also includes one or more additional responses to associated random access preamble messages.

A further exemplary embodiment in accordance with this invention is an apparatus for allocating resources between a mobile communication device and a network access node. The apparatus includes means for forming a random access response message which includes a response to a random access preamble message. The response to the random access preamble message includes UL resource allocation information for scheduling an UL transmission for a user equipment. The UL resource allocation information includes information identifying one or more individual time subframe allocated for the UL transmission. The apparatus also includes means for sending the random access response message to the user equipment.

In an additional exemplary embodiment of the apparatus above, the apparatus also includes means for receiving the UL transmission in accordance with the UL resource allocation in the identified one or more individual time subframe.

In a further exemplary embodiment of any one of the apparatus above, the information identifying the one or more individual time subframe is expressed in one or more bit and is configured to identify up to at least two individual time subframes.

In an additional exemplary embodiment of any one of the apparatus above, the information identifying the one or more individual time subframe indicates an offset.

In a further exemplary embodiment of any one of the apparatus above, the apparatus also includes means for allocating the UL resources.

In an additional exemplary embodiment of any one of the apparatus above, the means for sending is configured to broadcast the random access response message on a shared channel.

In a further exemplary embodiment of any one of the apparatus above, the allocation includes an allocation of a FDD resource and/or a TDD resource.

In an additional exemplary embodiment of any one of the apparatus above, the random access response message also includes one or more additional responses to associated random access preamble messages.

A further exemplary embodiment in accordance with this invention is a computer readable medium tangibly encoding a computer program for allocating resources between a mobile communication device and a network access node. The computer program includes program instructions, execution of the program instructions resulting in operations including forming a random access response message which includes a response to a random access preamble message. The response to the random access preamble message includes UL resource allocation information for scheduling an UL transmission for a user equipment. The UL resource allocation information includes information identifying one or more individual time subframe allocated for the UL transmission. The program instructions also include sending the random access response message to the user equipment.

In an additional exemplary embodiment of the computer readable medium above, the program instructions also include receiving the UL transmission in accordance with the UL resource allocation in the identified one or more individual time subframe.

In a further exemplary embodiment of any one of the computer readable media above, the information identifying the one or more individual time subframe is expressed in one or more bit and is configured to identify up to at least two individual time subframes.

In an additional exemplary embodiment of any one of the computer readable media above, the information identifying the one or more individual time subframe indicates an offset.

In a further exemplary embodiment of any one of the computer readable media above, the program instructions also include allocating the UL resources.

In an additional exemplary embodiment of any one of the computer readable media above, sending includes broadcasting the random access response message on a shared channel.

In a further exemplary embodiment of any one of the computer readable media above, the allocation includes an allocation of a FDD resource and/or a TDD resource.

In an additional exemplary embodiment of any one of the computer readable media above, the random access response message also includes one or more additional responses to associated random access preamble messages.

A further exemplary embodiment in accordance with this invention is an apparatus for allocating resources between a mobile communication device and a network access node. The apparatus includes a controller which includes a message generating block configured to form a random access response message which includes a response to a random access preamble message. The response to the random access preamble message includes UL resource allocation information for scheduling an UL transmission for a user equipment. The UL resource allocation information includes information identifying one or more individual time subframe allocated for the UL transmission. The controller is also configured to operate with a transmitter to send the random access response message to the user equipment.

In an additional exemplary embodiment of the apparatus above, the apparatus also includes a receiver configured to receive the UL transmission in accordance with the UL resource allocation in the identified one or more individual time subframe.

In a further exemplary embodiment of any one of the apparatus above, the information identifying the one or more individual time subframe is expressed in one or more bit and is configured to identify up to at least two individual time subframes.

In an additional exemplary embodiment of any one of the apparatus above, the information identifying the one or more individual time subframe indicates an offset.

In a further exemplary embodiment of any one of the apparatus above, the controller also includes a resource allocating block configured to allocate the UL resources.

In an additional exemplary embodiment of any one of the apparatus above, the transmitter is configured to broadcast the random access response message on a shared channel.

In a further exemplary embodiment of any one of the apparatus above, the allocation includes an allocation of a FDD resource and/or a TDD resource.

In an additional exemplary embodiment of any one of the apparatus above, the random access response message also includes one or more additional responses to associated random access preamble messages.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of exemplary embodiments in accordance with this invention may be illustrated and described as block diagrams, flow charts, or using some other pictorial representation, it is well understood that these blocks, apparatus, systems, techniques or methods described herein may be implemented in, as nonlimiting examples, hardware, software, firmware, special purpose circuits or logic, general purpose hardware or controller or other computing devices, or some combination thereof.

As such, it should be appreciated that at least some aspects of the exemplary embodiments of the inventions may be practiced in various components such as integrated circuit chips and modules. The design of integrated circuits is by and large a highly automated process. Complex and powerful software tools are available for converting a logic level design into a semiconductor circuit design ready to be fabricated on a semiconductor substrate. Such software tools can automatically route conductors and locate components on a semiconductor substrate using well established rules of design, as well as libraries of prestored design modules. Once the design for a semiconductor circuit has been completed, the resultant design, in a standardized electronic format may be transmitted to a semiconductor fabrication facility for fabrication as one or more integrated circuit devices.

Various modifications and adaptations to the foregoing exemplary embodiments of this invention may become apparent to those skilled in the relevant arts in view of the foregoing description, when read in conjunction with the accompanying drawings. However, any and all modifications will still fall within the scope of the nonlimiting and exemplary embodiments of this invention.

For example, while the exemplary embodiments have been described above in the context of the EUTRAN (UTRAN LTE) system, it should be appreciated that exemplary embodiments in accordance with this invention are not limited for use with only this one particular type of wireless communication system, and that they may be used to advantage in other wireless communication systems.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several nonlimiting and nonexhaustive examples.

Further, the various names used for the described parameters (e.g., UE, eNB, etc.) are not intended to be limiting in any respect, as these parameters may be identified by any suitable names. Further, the various names assigned to different channels (e.g., PRACH, etc.) are not intended to be limiting in any respect, as these various channels may be identified by any suitable names.

Furthermore, some of the features of the various nonlimiting and exemplary embodiments of this invention may be used to advantage without the corresponding use of other features. As such, the foregoing description should be considered as merely illustrative of the principles, teachings and exemplary embodiments of this invention, and not in limitation thereof.

What is claimed is:

1. A method comprising:
sending a random access preamble message,
receiving a random access response message at a first subframe comprising a response to the random access preamble message,
where the random access response message comprises uplink resource allocation information for scheduling an uplink transmission,
where the uplink resource allocation information comprises information identifying at least one individual time subframe allocated for the uplink transmission,
where the information identifying the at least one individual time subframe is expressed in at least one bit indicating whether the at least one individual time subframe is delayed; and
in response to the at least one bit indicating that the at least one individual time subframe is delayed, sending the uplink transmission in a subframe subsequent to at least one individual time subframe which would have been identified if the at least one bit had indicated that the at least one individual time subframe is not delayed, where the identified at least one individual time subframe is offset from the first subframe.

2. The method of claim 1, where the information identifying the at least one individual time subframe is configured to identify up to at least two individual time subframes.

3. The method of claim 1, where the at least one individual time subframe is delayed as compared to a nominal value of subframes.

4. The method of claim 1, where the identified at least one individual time subframe is delayed from the first subframe by a number of subframes equal to a nominal value.

5. The method of claim 1, wherein the method is performed by execution of a computer processor of program instructions tangibly encoded on a non-transitory computer readable medium.

6. An apparatus comprising at least one processor; and at least one memory including computer program code, the at least one memory and the computer program code configured to, with the at least one processor, cause the apparatus to perform at least the following:

to receive at a first subframe a random access response message comprising a response to a random access preamble message, where the random access response message comprises uplink resource allocation information for scheduling an uplink transmission, where the uplink resource allocation information comprises information identifying at least one individual time subframe allocated for the uplink transmission, where the information identifying the at least one individual time subframe is expressed in at least one bit indicating whether the at least one individual time subframe is delayed; and in response to the at least one bit indicating that the at least one individual time subframe is delayed, to send the uplink transmission in a subframe subsequent to at least one individual time subframe which would have been identified if the at least one bit had indicated that the at least one individual time subframe is not delayed, where the identified at least one individual time subframe is offset from the first subframe.

7. The apparatus of claim 6, where the information identifying the at least one individual time subframe is configured to identify up to at least two individual time subframes.

8. The apparatus of claim 6, where the at least one individual time subframe is delayed as compared to a nominal value of subframes.

9. A method comprising:

forming a random access response message comprising a response to a random access preamble message, where the response to the random access preamble message comprises uplink resource allocation information for scheduling an uplink transmission for a user equipment, where the uplink resource allocation information comprises information identifying at least one individual time subframe allocated for the uplink transmission, where the information identifying the at least one individual time subframe is expressed in at least one bit indicating whether the at least one individual time subframe is delayed, and where, when the at least one individual time subframe is to be delayed, the identified at least one individual time subframe is to be offset from a first subframe; and sending the random access response message to the user equipment at the first subframe.

10. The method of claim 9, where the information identifying the at least one individual time subframe is configured to identify up to at least two individual time subframes.

11. The method of claim 9, where the at least one individual time subframe is delayed as compared to a nominal value of subframes.

12. The method of claim 9, wherein the method is performed by execution of a computer processor of program instructions tangibly encoded on a non-transitory computer readable medium.

13. An apparatus comprising at least one processor; and at least one memory including computer program code, the at least one memory and the computer program code configured to, with the at least one processor, cause the apparatus to perform at least the following:

to generate a random access response message comprising a response to a random access preamble message;

where the response to the random access preamble message comprises uplink resource allocation information for scheduling an uplink transmission for a user equipment, where the uplink resource allocation information comprises information identifying at least one individual time subframe allocated for the uplink transmission, where the information identifying the at least one individual time subframe is expressed in at least one bit indicating whether the at least one individual time subframe is delayed, and where, when the at least one individual time subframe is to be delayed, the identified at least one individual time subframe is to be offset from a first subframe; and to send the random access response message to the user equipment at the first subframe.

14. The apparatus of claim 13, where the information identifying the at least one individual time subframe is configured to identify up to at least two individual time subframes.

15. The apparatus of claim 13, wherein the at least one memory and the computer program code are further configured to cause the apparatus to broadcast the random access response message on a shared channel.

16. A method comprising:

sending a random access preamble message, receiving a random access response message at a first subframe comprising a response to the random access preamble message, where the random access response message comprises uplink resource allocation information for scheduling an uplink transmission, where the uplink resource allocation information comprises information identifying at least one individual time subframe allocated for the uplink transmission, where the information identifying the at least one individual time subframe is expressed in at least one bit indicating whether the at least one individual time subframe is delayed; and in response to the at least one bit indicating that the at least one individual time subframe is not delayed, sending the uplink transmission in the identified at least one individual time subframe, where the identified at least one individual time subframe is offset from the first subframe.

17. The method of claim 16, where the information identifying the at least one individual time subframe is configured to identify up to at least two individual time subframes.

18. The method of claim 16, where, when each of the at least one bit is set to zero, the at least one individual time subframe is not to be delayed.

19. An apparatus comprising at least one processor; and at least one memory including computer program code, the at least one memory and the computer program code configured to, with the at least one processor, cause the apparatus to perform at least the following:

to receive at a first subframe a random access response message comprising a response to a random access preamble message, where the response comprising uplink resource allocation information for scheduling an uplink transmission, where the uplink resource allocation information comprises information identifying at least one individual time subframe allocated for the uplink transmission, where the information identifying the at least one individual time subframe is expressed in at least one bit indicating whether the at least one individual time subframe is delayed; and in response to the at least one bit indicating that the at least one individual time subframe is not delayed, to send the uplink transmission in the identified at least one individual time subframe, where the identified at least one individual time subframe is offset from the first subframe.

20. The apparatus of claim 19, where the information identifying the at least one individual time subframe is configured to identify up to at least two individual time subframes.

21. The apparatus of claim 19, where, when each of the at least one bit is set to zero, the at least one individual time subframe is not to be delayed.

22. A method comprising:
forming a random access response message comprising a response to a random access preamble message,
where the response to the random access preamble message comprises uplink resource allocation information for scheduling an uplink transmission for a user equipment,
where the uplink resource allocation information comprises information identifying at least one individual time subframe allocated for the uplink transmission,
where the information identifying the at least one individual time subframe is expressed in at least one bit indicating whether the at least one individual time subframe is delayed, and
where, when the at least one individual time subframe is not to be delayed, the identified at least one individual time subframe is to be offset from a first subframe; and
sending the random access response message to the user equipment at the first subframe.

23. The method of claim 22, where the information identifying the at least one individual time subframe is configured to identify up to at least two individual time subframes.

24. The method of claim 22, where, when the at least one individual time subframe is not to be delayed, each of the at least one bit is set to zero.

25. An apparatus comprising at least one processor; and at least one memory including computer program code, the at least one memory and the computer program code configured to, with the at least one processor, cause the apparatus to perform at least the following:
to generate a random access response message comprising a response to a random access preamble message;
where the response to the random access preamble message comprises uplink resource allocation information for scheduling an uplink transmission for a user equipment,
where the uplink resource allocation information comprises information identifying at least one individual time subframe allocated for the uplink transmission,
where the information identifying the at least one individual time subframe is expressed in at least one bit indicating whether the at least one individual time subframe is delayed, and
where, when the at least one individual time subframe is not to be delayed, the identified at least one individual time subframe is to be offset from a first subframe; and
to send the random access response message to the user equipment at the first subframe.

26. The apparatus of claim 25, where the information identifying the at least one individual time subframe is configured to identify up to at least two individual time subframes.

27. The apparatus of claim 25, where, when the at least one individual time subframe is not to be delayed, each of the at least one bit is set to zero.

* * * * *